March 22, 1960 H. HUBBELL 2,930,019
ADJUSTABLE MULTI-WIRE ELECTRICAL CONNECTING MEANS
Filed Oct. 6, 1954 2 Sheets-Sheet 1
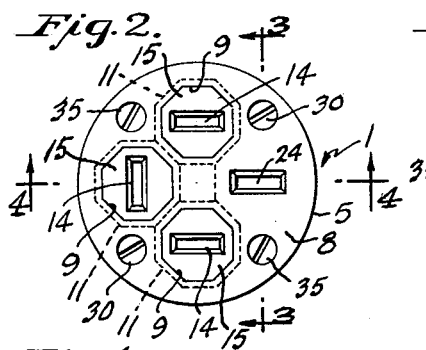
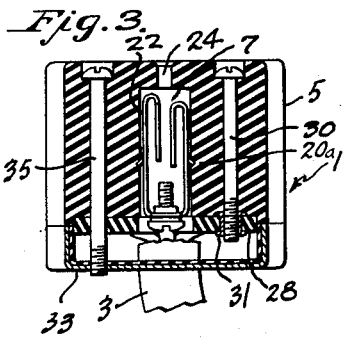
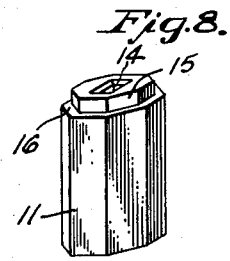
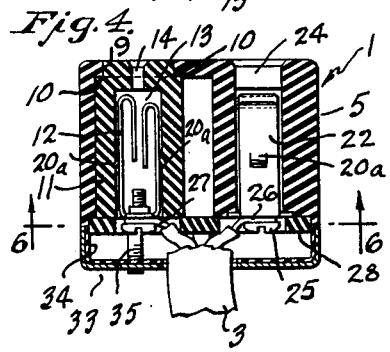
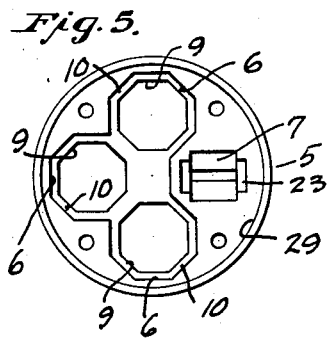
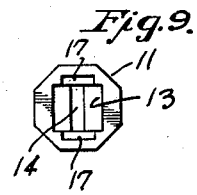
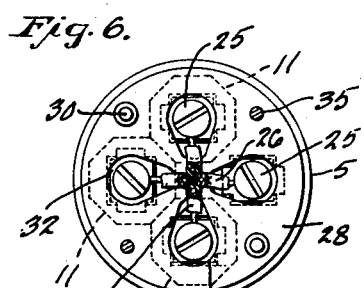
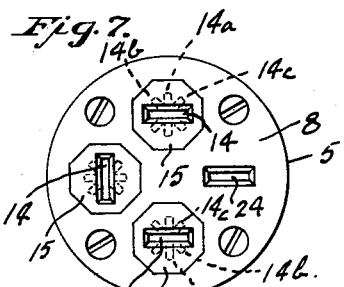
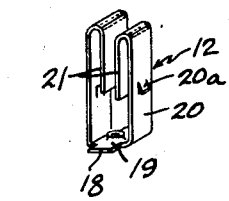
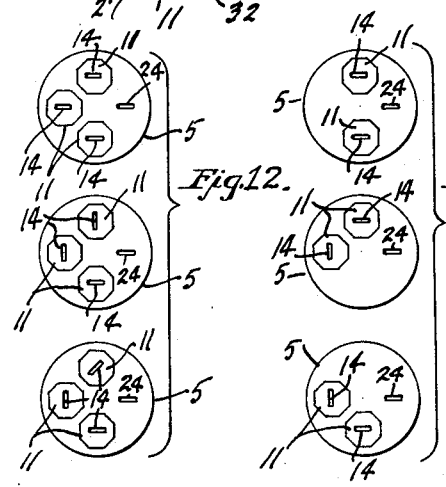
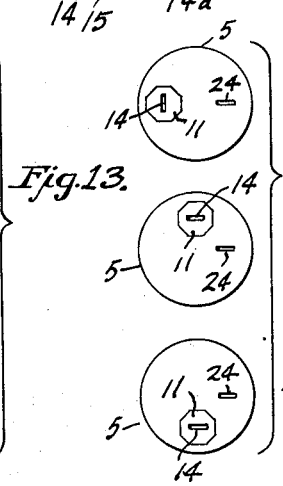
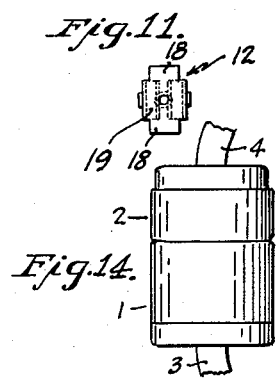
INVENTOR
Harvey Hubbell
BY
Wooster & Davis
ATTORNEYS March 22, 1960 H. HUBBELL 2,930,019
ADJUSTABLE MULTI-WIRE ELECTRICAL CONNECTING MEANS
Filed Oct. 6, 1954 2 Sheets-Sheet 2
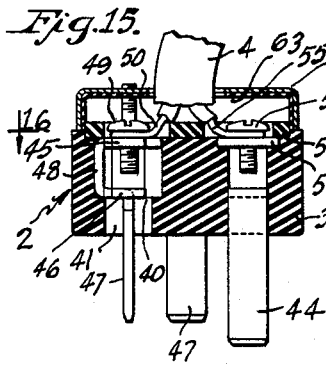
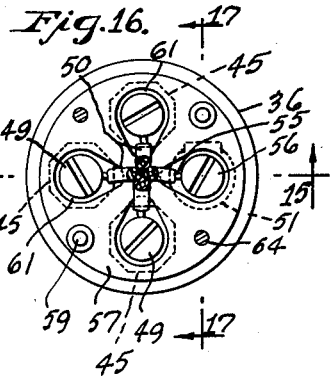
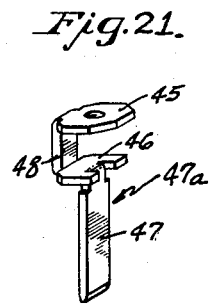
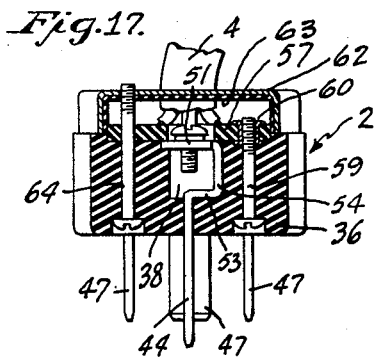
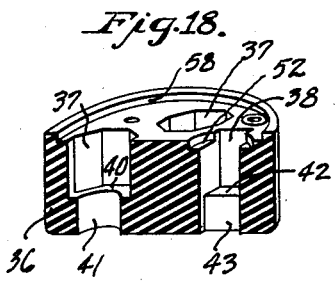
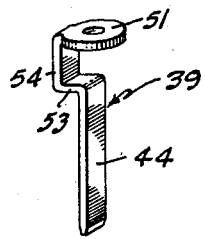
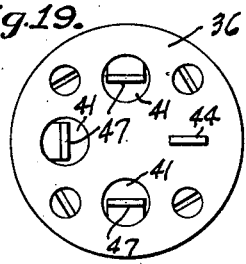
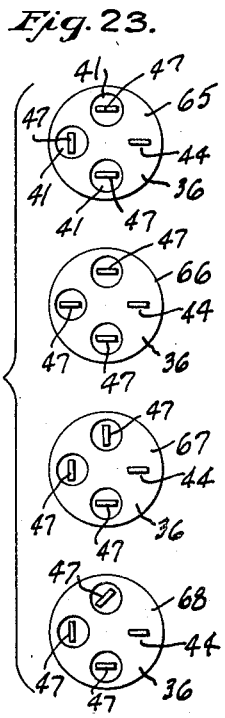
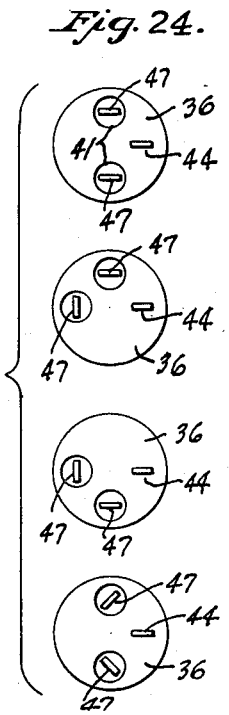
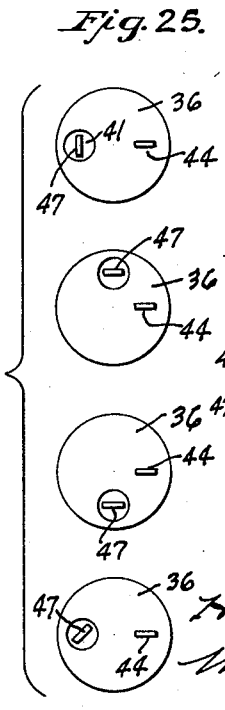
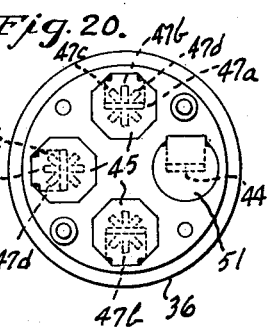
INVENTOR
Harvey Hubbell
BY
ATTORNEYS

2,930,019

ADJUSTABLE MULTI-WIRE ELECTRICAL CONNECTING MEANS

Harvey Hubbell, Long Hill, Conn., assignor to Harvey Hubbell, Incorporated, Bridgeport, Conn., a corporation of Connecticut Application October 6, 1954, Serial No. 460,702

6 Claims. (Cl. 339—31)

This invention relates to an adjustable multi-wire electrical connecting means, and has for an object to provide a connecting means of this character in which the contact elements may be adjusted to different angular positions, and the number of contact elements may be varied so as to permit the formation of a large number of different combinations and different arrangements of the contacts.

Another object is to provide a simple and effective construction for accomplishing these results.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a side view on a reduced scale of a wire connector complete showing the connector body and cap together to make a detachable electrical connection in a cable or similar electrical conductor means;

Fig. 2 is a top end view of the connector body;

Fig. 3 is a longitudinal section thereof substantially on line 3—3 of Fig. 2;

Fig. 4 is a longitudinal section substantially on line 4—4 of Fig. 2;

Fig. 5 is a view of the opposite end of the body member only with the protecting metal cap and other parts removed;

Fig. 6 is a bottom plan view and partial section with the metal cap removed, the view being substantially on line 6—6 of Fig. 4;

Fig. 7 is an end view similar to Fig. 2 but indicating different angular positions for the receptacle contacts and the cap and the contact blade entrance slots leading thereto;

Fig. 8 is a perspective view of one of the adjustable insulating units in which a receptacle contact is mounted;

Fig. 9 is an end view thereof looking toward the bottom of Fig. 8;

Fig. 10 is a perspective view of one of the receptacle contacts;

Fig. 11 is an end view looking toward the bottom of Fig 10;

Fig. 12 is a series of diagrammatical views indicating some of the multiple combination arrangements which may be effected by using three adjustable receptacle contacts in addition to a fixed grounding contact;

Fig. 13 is a similar view showing examples of different combinations and arrangements which may be effected by using two receptacle contacts, in addition to the fixed grounding contact;

Fig. 14 are similar views showing examples of different arrangements which may be effected with one receptacle contact only in addition to the fixed grounding contact;

Fig. 15 is a longitudinal section of the connector cap taken substantially on line 15—15 of Fig. 16 with the metal protective cap in place;

Fig. 16 is a partial end view and partial section taken substantially on line 16—16 of Fig. 15 with the protective cap removed;

Fig. 17 is a longitudinal section of the cap member taken substantially on line 17—17 of Fig. 16 with the protective cap in place;

Fig. 18 is a perspective sectional view of the insulating body member of the cap;

Fig. 19 is an end view of the connector cap looking toward the bottom of Figs. 15 and 17;

Fig. 20 is an end view looking toward the top of the body of Fig. 18 and indicating in dotted lines different angular positions of the adjustable contacts;

Fig. 21 is a perspective view of one of the adjustable contacts of this cap;

Fig. 22 is a perspective view of the fixed grounding blade contact of the cap;

Fig. 23 shows diagrammatically a number of different combinations and arrangements of the blade contacts of the cap which may be effected by using three adjustable contacts in combination with one fixed grounding contact to correspond with and for use with the connector body receptacle contact arrangement of Fig. 12;

Fig. 24 are similar views showing examples of different combinations and arrangements which may be effected by using two adjustable contacts with one fixed grounding contact for use with two receptacle contacts in addition to the fixed grounding contact, as illustrated in Fig. 13; and Fig. 25 comprises diagrammatical views illustrating different combinations which can be effected with one adjustable blade contact with one fixed grounding contact.

As indicated in Fig. 1, the form of adjustable multi-wire electrical connecting means shown comprises a wire connector including a connector body 1 and a connector cap 2, the body 1 carrying the receptacle contacts (not shown) while the cap 2 carries the blade contacts (also not shown) inserted into the connector body for engagement with the receptacle contacts mounted therein, thus establishing electrical connection in the conductors in the insulated cord or cable 3 connected to the receptacle contacts, with the conductor wires in the insulated cord or cable 4 connected to the blade contacts of the cap, as shown in the other views of the drawings.

Referring first to Figs. 2 to 14 which illustrate the details of the connector body portion or element of the connecting means, this element comprises a body member 5 of molded insulating material provided with a plurality of longitudinally extending sockets or compartments 6 and 7, in the present construction there being four of these sockets arranged ninety degrees apart and symmetrically about the longitudinal axis of the body, there being three of the sockets 6 and a fourth socket 7, in the form shown of somewhat different shape from the sockets 6, although not necessarily so. However, if it is different it will indicate which is the grounding contact. The sockets 6 are polygonal shape and the number of sides may be varied, but it is preferred to make them octagonal, as shown in the present construction, although as shown in Fig. 5 two of the inner sides of the diametrically opposite sockets blend with the inner sides of the intermediate socket, and each of these sockets opens through the upper end wall 8 of the body 5 through a reduced similarly shaped opening 9, in this case octagonal, thus forming a stop shoulder 10 at the inner side of each opening within the socket 6. Mounted in each socket 6 is a contact element of similar polygonal shape seated in the socket, this element comprising an insulating unit 11 in which is mounted a receptacle contact 12. This polygonally shaped member 11 is molded of insulating material and has a longitudinal chamber 13 in which the receptacle contact 12 is mounted, this chamber opening through the lower or inner end of the unit member 11 for insertion of the contact, and provided with an elongated entrance slot 14 in its upper or outer end leading to this chamber for entrance of a blade contact of the cap member, as will later be described, to engage and form electrical connection with the receptacle contact 12. The upper or outer end of the member 11 includes a reduced portion 15, preferably of the same polygonal shape as the main body portion, and when assembled seating in the opening 9 in the upper end wall of the body 5. This reduced portion forms a stop shoulder 16 which engages the shoulder 10 at the inner side of the opening 9. The longitudinal chamber 13 in the member 11 is preferably substantially square or rectangular in shape, as shown in Fig. 9, and is recessed at its inner end, as indicated at 17, to form seats for similarly shaped lugs 18 on the transverse end wall 19 of the contact 12 to the opposite side edges of which are connected the spring contact fingers 20 of the contact 12, and these fingers are also preferably folded backwardly upon themselves toward each other at their free ends, as indicated at 21, to provide spring contact fingers to engage the blade contact of the cap when inserted to establish an effective electrical connection therewith.

The socket 7 is provided for mounting a fixed grounding contact 22, although it is the same shaped construction as the contact 12. Although this could be mounted in an adjustable member 11 the same as the other contact, it is preferred that this be a fixed contact, and therefore the socket 7 is made substantially square or rectangular to receive the contact 22, and it is recessed at its inner end, as indicated at 23, to receive the lugs 18 of the end wall of the contact to help position the contact in this socket. The front wall 8 of the body 5 is provided with an elelongated entrance slot 24 leading to this socket and contact for entrance of a grounding blade contact on the cap member, as will later be described. Each contact 12 or 22 is provided with means for connecting a conductor wire thereto, and in the form shown it comprises a binding post screw 25 threaded into the end wall 19 of the contacts, and in Fig. 4 the conductor wires 26 and 27 of the insulated cord 3 are shown connected to these contacts.

Each contact 12 or 22 is also preferably provided with means for gripping the sides of the chamber in which it is located to retain it in the chamber. Thus, each of the side members or fingers 20 is provided with a lug 20a lanced and bent outwardly from this member into an inclined position, forming a sharp edge facing rearwardly or in the opposite direction from the entrance slots 14 and 24, and these sharp edges engage the side walls of the chambers in which the contacts are mounted and slightly dig into the insulating material to thus form a grip thereon to prevent the contacts being pushed downwardly or inwardly as the blade contacts of the cap are inserted in this connector.

The adjustable contact elements each comprising the member 11 and the receptacle contacts 12 are secured in their respective sockets 6, and the grounding contact 22 are held in their respective sockets by an insulating cover or retaining plate 28 seated in a recess 29 in the inner or lower end of the body 5 and held therein by any suitable means, such, for example, as screws 30, extending longitudinally through the body 5 from the top thereof and threaded into suitable eyelets or rivets 31 mounted in this plate. This plate is provided with suitable openings 32 to expose the binding post screws 25 and permit connection of the lead wires to the respective contacts.

After these parts have been assembled and the electrical connections made, they may be protected by a metal cap 33 which is preferably of cupped sheet metal having an insulating liner 34. It is connected to the body 5 by suitable screws 35 extending longitudinally through the member 5 and threaded into the end wall of the shell or cap 33.

It will be seen that because of the polygonal shape of the socket 6 and the similar polygonal shape of the insulating unit member 11 of the contact element including the receptacle contact 12 mounted in this member, that this member and the receptacle contact 12 may be seated in the polygonal socket at different angular positions about the axis of this contact element, thus positioning not only contact 12 but also the entrance slots 14 at different angular positions to correspond with and thus be capable of receiving blade contacts on the cap 2 arranged in different angular positions about their axes. This cap member will be more fully described in connection with Figs. 15 to 25. As the socket 6 and the member 11 are in this form shown of octagonal shape, the member 11 and the slot 14 may be arranged in four different angular positions, as indicated by the full line and the dotted line positions of Fig. 7. Thus, for example, the upper slot 14 may be arranged either horizontally, as shown in full lines, vertically as shown by the dotted position 14a, or inclined at two forty-five degree angles as indicated at 14b and 14c, and each of the other contact elements can be similarly arranged, as also shown in this figure. Examples of these different arrangements are shown in Figs. 12, 13 and 14. In Fig. 12, three examples are shown, using three contact elements 11 and one fixed grounding contact, indicated by the slot 24. Thus the upper view of Fig. 12 shows all the entrance slots horizontal or in parallel relation. The middle view of Fig. 12 shows two of them vertical and two horizontal, while the lower view shows one at a forty-five degree angle, one vertical, and two horizontal, in each case a fixed grounding contact slot 24 being shown horizontal, while each of the other three may be positioned at different angles. It will be understood that these are shown as three examples, but a large number of other combinations and arrangements could be formed by adjusting the three adjustable contact elements.

In Fig. 13 is shown three views indicating as examples three different arrangements of a larger number of combinations which can be secured with two adjustable contact elements only. Thus in the upper view all three slots are horizontal and parallel; in the center view two are horizontal and one vertical with one horizontal at the upper part of the body, and in the lower view there are two horizontal and one vertical with one horizontal at the lower part of the body.

In Fig. 14 are shown diagrammatical views similarly indicating a plurality of different combinations and arrangements which may be formed by using one adjustable contact only in addition to the fixed grounding contact.

It is to be understood that in Figs. 12, 13 and 14, only the contacts to be used with the corresponding cap member are shown, Fig. 12 being for a four-contact connector, Fig. 13 a three-contact, and Fig. 14 a two-contact, the extra sockets and contacts being omitted in Figs. 13 and 14 to make the illustration clearer. The body member 5 may be molded in each instance with the three octagonal sockets 6 and either three, two or one of the adjustable contact elements comprising the member 11 and its receptacle contact 12 used for the different combinations of arrangements, examples of which are shown in Figs. 12 and 14, depending on whether a four-wire, three-wire, or two-wire connector is desired. If one or more is not to be used, as indicated in Figs. 13 and 14, the receptacle contact 12 may be omitted from the member 11 in the vacant locations indicated, or if it is determined in advance what arrangements are desired the body 5 could be molded with either the one, two or three sockets; or if it is molded with three sockets, those not used could later be closed or filled with some insulating material.

Figs. 15 to 25 show a construction of cap with adjustable blade contacts, which may be adjusted and arranged to correspond with the arrangements of the receptacle contacts in the connector body elements of Figs. 2 to 14, and therefore this cap can be used with the connector body elements to make the electrical connections, as indicated in Fig. 1.

This cap construction shown comprises a body 36 molded of insulating material and provided with a plurality of polygonal sockets 37 arranged similar to the sockets 6 of the body of the connector element, and another rectangularly shaped socket 38 for a fixed grounding contact 39. The sockets 37, the same as the sockets 6, would be of a different number of sides, but preferably are octagonal to correspond with those of Figs. 2 to 14, and they open through the top of the body, as indicated in Fig. 18. It is preferred, however, not to carry the polygonal shape entirely through the body 36, but to terminate it intermediate the length of the body in a shoulder 40 and with the lower part 41 opening through the lower end circular or any other desired shape, but of a size to permit turning of contact 47 therein. Similarly, the upper portion of the socket 38 is preferably square or rectangular, terminating in a shoulder 42, with its lower portion 43 extending through the lower end of the body comprising an elongated slot of substantially the size and shape of the blade portion 44 of the contact 39.

One of the contact elements 47a mounted in the polygonal sockets 37 is shown in perspective in Fig. 21. In this case the contact itself is not mounted on an adjustable support or carrier, such as the insulating unit 11 for the receptacle contact 12 (although it could be mounted in such a carrier if desired), but this contact is formed with a head portion 45 of the same polygonal shape as the upper portion of the socket 37 so as to be positioned therein at different angular positions about the axis of the socket and the contact. This contact also includes an intermediate plate portion 46 parallel to the head 45 and seating on the shoulder 40 in the socket 37 with the flat blade contact portion 47 extending through the portion 41 of the socket and projecting below the lower end of the body 36, as indicated in Figs. 15 and 17. The two portions 45 and 46 are connected by an intermediate flat portion 48, which when the contact element is in the socket 37 may rest against one of the flat sides of the socket. Means is provided for connecting a conductor wire of the insulating cable 4 to the contact element, in the present construction comprising a binding post screw 49, connecting a wire 50 to the contact element, as indicated in Fig. 15.

The contact 39 is a fixed grounding contact and has a circular head 51 seating in a recess 52 at the upper end of the socket 38. It has an intermediate offset portion 53 seating on the shoulder 42 connected with the head by the connecting portion 54 seating against one side of the socket 38, and with the blade portion 44 extending through the elongated opening 43 and projecting from the lower end of the body 36, as shown in Figs. 15 and 17. The grounding wire 55 of the conductor cable 4 may be connected to this contact by any suitable means, such as the binding screw 56 threaded into the head 51. After these contact elements 39 and 47 are mounted in their respective sockets in the body 36, they may be retained therein by a suitable insulating plate 57 seated against the upper end surface of the body 36 and in the recess 58 formed thereon. They may be secured in position by suitable screws 59 passing through the body and threaded in suitable eyelets 60 in the plate. This plate is provided with suitable openings 61 to expose the heads of the binding screws 56 and permit suitable clearance for connecting the conductor wires 50 and 55 to the contacts. After these elements have been assembled and the connections made to the conductors in the cable 4, a protective metal cap 62 in the form of a cup-shaped metal member having an insulating lining 63 may be mounted on the upper end of the body 36 over the plate 11 and secured to the body by any suitable means, such, for example, as the screws 64 threaded into the top wall of this cap.

It will be seen from this that the grounding contact 39 is a stationary or fixed contact in the body 36 and its flat blade contact portion 44 projects from the lower end of the body as indicated. The other contacts each comprising the blade contact 47, because of its polygonal head 45 seated in the polygonal socket 37, may be adjusted to different angular positions about the axis of the socket and the contact, as indicated in Figs. 19, 20, and 23 to 25. A few of the different combinations which may be secured are shown in Figs. 23 to 25, and different angular positions of the contact 47 are shown in dotted lines in Fig. 50. That is, each one may be mounted so as to locate the blade portion 47 in the horizontal position as shown at 47a parallel to the fixed blade 44, in the vertical position at right angles thereto as shown at 47b, or in an intermediate position at 45° thereto as shown at 47c and 47d. A few of the different combinations and arrangements that may therefore be secured by shifting these contacts to these different positions are shown diagrammatically in Fig. 23. The upper diagram 65 shows the upper and lower contacts 47 parallel to the fixed contact 44, while the intermediate contact 47 is at right angles thereto. In the next diagram 66, all three contacts 47 are shown parallel to the contact 44. In the next diagram 67, the lower contact 47 is shown parallel to the contact 44, while the other contacts 47 are at right angles thereto. In diagram 68 the lower contact 47 is shown parallel to the contact 44, the upper one at 45° thereto, and the intermediate contact at right angles. These illustrate only a few of the possible combinations and arrangements which can be secured with the three adjustable contact elements 47 to correspond with the large number of arrangements possible with the three adjustable receptacle contacts of the connector body element of Figs. 2 to 7, some forms of which are shown in Fig. 12.

Fig. 24 illustrates some of the possible combinations and arrangements which can be secured by using only two of the adjustable contacts 47 with the fixed contact 44, and correspond with arrangements of the receptacle contacts some forms of which are illustrated in Fig. 13 and for use in combination therewith. Similarly, Fig. 25 illustrates diagrammatically some of the different arrangements which may be effected by using one adjustable contact 47 only, with the fixed contact 44, and to accommodate the cap for use with a connector body member using one adjustable receptacle contact element only, some illustrations of which are shown in Fig. 14.

It will be understood that in Figs. 24 and 25, only the contacts to be used in the combination shown and their sockets 37 are indicated, the other sockets being omitted for clearness, as these views are diagrammatical and merely to illustrate different combinations of the contacts. The same is true of Figs. 13 and 14.

As described in connection with the connector body element of Figs. 2 to 14, insulating body 36 can be molded with the three polygonal sockets 37 and the socket 38 for the fixed contact can be used with one, two or three adjustable contact elements 47, and the extra sockets when only one or two of the contacts 47 are used may be filled with suitable material, or, if it has been determined in advance how many contacts are to be used, the body 36 may be molded with one, two or three of the polygonal sockets as required. In the connector body element of Figs. 2 to 14, as this is the receptacle part of the connection the adjustable contact element is the carrier of insulating unit 11 with the receptacle contact 12 in it, while in the connector cap element cooperating therewith and illustrated in Figs. 15 to 25 the adjustable contact element is the blade contact member 47a.

It will be seen from the above that this cord connector including the connector body element 1 and the connector cap 2 can be made with a large number of different combinations and arrangements of the receptacle contacts 12 and the cooperating cap or blade contacts 47 for use therewith, to suit different conditions or requirements by different customers, and also to provide special arrangements of contacts, either for special layouts or special customers.

Although the invention has been shown and described as incorporated in a connector comprising a connector body 1 and a connector cap 2, the element 1 forming the receptacle portion of the connecting means, it will be understood this same construction can be used in other types of receptacle connectors, that is, for example, this body member could be mounted on a bridge member or support for mounting the receptacle in a wall outlet box or similar receptacle mounting for use with the connector cap.

Having thus set forth the nature of my invention, I claim:

1. In an electrical connecting means of the character described, an insulating body member provided with a polygonally shaped socket opening through the front face thereof, a contact element in said socket comprising an insulating unit and a contact mounted therein, said unit being of similar polygonal shape to that of the socket seated in the socket and provided with a chamber therein, said unit also provided with a contact blade entrance slot in its forward end leading to said chamber, said contact being a receptacle contact in the chamber to cooperate with an inserted blade contact, said unit adapted to be seated in the socket in different angular positions about its axis to position the slot in different angular positions, a second insulating body member provided with a polygonally shaped socket, a contact element including a portion seated in said latter socket and a contact blade projecting from one end of this body for insertion in the entrance slot in the first body member, said portion of the latter contact element in the socket having a plurality of sides adapted to seat in said socket in a plurality of angular positions about the axis of the socket to position the contact blade in different angular positions to correspond with those of the entrance slot, and means for connecting conductor wires to the contacts.

2. In an electrical connecting means of the character described, an insulating body member provided with a polygonally shaped socket opening through the front face thereof, a contact element in the socket comprising an insulating unit provided with a chamber therein with a contact blade entrance slot in its forward end leading to said chamber and a receptacle contact in the chamber to cooperate with an inserted blade contact, said insulating unit being of similar polygonal shape to that of the socket so as to seat in the socket in different angular positions about its axis to position the slot in different angular positions, a second insulating body member provided with a polygonally shaped socket, a contact element including a similar polygonally shaped head seated in the latter socket and a contact blade projecting from one end of this body for insertion in the entrance slot in the first body member, said polygonal head adapted to seat in its socket in a plurality of different angular positions about the axis of the socket to position the blade in different angular positions to correspond with those of the slot, and means for connecting conductor wires to the contacts.

3. In an electrical connecting means of the character described, an insulating body member provided with a plurality of polygonally shaped sockets opening through the front face thereof and a chamber in the body with an elongated entrance slot in its front face leading to said chamber, a grounding receptacle contact in said chamber, a contact element in each socket each comprising an insulating unit provided with a chamber therein with a contact blade entrance slot in its forward end leading to said chamber and a receptacle contact in the chamber to cooperate with an inserted blade contact, each insulating unit being of similar polygonal shape to that of its socket so as to seat in this socket in different angular positions about its axis to position its slot in different angular positions, a second insulating body member provided with a plurality of polygonally shaped sockets, a fixed grounding contact blade projecting from one end of said latter body member for insertion into engagement with the grounding contact in the first body member, a plurality of contact elements mounted in the sockets in the second body member each including a polygonal head corresponding to the shape of its socket and a contact blade projecting from the end of the body with the grounding contact blade for insertion in the entrance slots of the contact elements in the first body member, said heads of the latter contact elements adapted to seat in different angular positions in their respective sockets to position their blade contacts in different angular positions to correspond with those of the slots in which they are to be inserted, and means for connecting conductor wires to the contacts.

4. In an electrical connecting means of the character described, an insulating body member provided with a polygonally shaped socket opening through the front face thereof, a contact element in said socket comprising an insulating unit and a receptacle contact mounted therein, said unit being of similar polygonal shape to that of the socket seated in the socket and provided with a chamber therein and an entrance slot in its forward end leading to said chamber for entrance of the contact blade of an attachment plug cap, and said contact in the unit being located in the chamber and adapted to be engaged by said blade.

5. In an electrical connecting means of the character described, an insulating body member provided with a polygonally shaped socket opening through the front face thereof with a reduced opening forming a shoulder at the inner side thereof, a contact element in said socket comprising an insulating unit and a receptacle contact mounted therein, said unit of similar polygonal shape to that of the socket seated in the socket and including a reduced end portion forming a shoulder, said reduced end portion being in said opening with the second shoulder against the first shoulder, said insulating unit provided with a chamber and an entrance slot in its reduced end leading to said chamber for insertion of the contact blade of an attachment plug cap, said chamber opening through the opposite end of said unit, and said contact in the unit being located in the chamber and adapted to be engaged by said blade and including means for connecting a lead wire to said contact.

6. In an electrical connecting means of the character described, an insulating body member provided with a polygonally shaped socket opening through the front face thereof with a reduced opening providing a shoulder in the socket at the inner side of said opening, a contact element in said socket comprising an insulating unit and a receptacle contact mounted therein, said unit being of similar polygonal shape to that of the socket seated in the socket and including a reduced end portion in said opening and a shoulder seated against the shoulder in the socket, said insulating unit provided with a chamber and an entrance slot in its reduced end leading to said chamber for insertion of a contact blade of an attachment plug cap, said chamber opening through the opposite end of said unit, said contact in the unit being located in the chamber and adapted to be engaged by said blade and including means for connecting a lead wire to said contact, an insulating plate over the latter end of the unit retaining it in the socket, and means securing the plate to the body.

References Cited in the file of this patent

UNITED STATES PATENTS

| | | |
|---|---|---|
| 1,249,247 | Thomas | Dec. 4, 1917 |
| 2,032,501 | Reynolds | Mar. 3, 1936 |
| 2,049,585 | Gunthorp | Aug. 4, 1936 |
| 2,162,453 | Field | June 13, 1939 |
| 2,380,916 | Beal | Aug. 7, 1945 |
| 2,417,928 | Guernsey | Mar. 25, 1947 |
| 2,557,818 | Eddy | June 19, 1951 |
| 2,650,353 | Lamb et al. | Aug. 25, 1953 |
| 2,730,639 | Lamb et al. | Jan. 10, 1956 |

FOREIGN PATENTS

| | | |
|---|---|---|
| 228,735 | Great Britain | Feb. 12, 1935 |
| 630,333 | Great Britain | Oct. 11, 1949 |